United States Patent
Kleeberg et al.

(10) Patent No.: US 6,527,181 B1
(45) Date of Patent: Mar. 4, 2003

(54) DEVICE AND METHOD FOR CHARACTERIZING AND IDENTIFYING AN OBJECT

(75) Inventors: Hans-Joachim Kleeberg, Waldbronn; Volker Reiss, Jockgrim; Dieter Hoepfel, Knittlingen, all of (DE)

(73) Assignee: Bruker Analytik GmbH, Rheinstetten (DE)

( * ) Notice: Subject to any disclaimer, the term of this patent is extended or adjusted under 35 U.S.C. 154(b) by 0 days.

(21) Appl. No.: 09/517,329

(22) Filed: Mar. 2, 2000

(30) Foreign Application Priority Data

Mar. 9, 1999 (DE) .......................................... 199 10 226

(51) Int. Cl.⁷ ................................................ G06K 7/10
(52) U.S. Cl. ............................ 235/462.03; 235/462.04; 235/462.07
(58) Field of Search ....................... 235/462.03, 462.04, 235/462.07

(56) References Cited

U.S. PATENT DOCUMENTS

| | | | |
|---|---|---|---|
| 3,743,820 A | * | 7/1973 | Willits et al. ............ 235/61.11 |
| 3,752,961 A | * | 8/1973 | Torrey ..................... 235/61.11 |
| 3,963,918 A | | 6/1976 | Jensen et al. ................ 250/223 |
| 4,478,095 A | * | 10/1984 | Bradley et al. .......... 73/864.21 |
| 4,493,989 A | * | 1/1985 | Hampson et al. ........... 235/464 |
| 5,046,841 A | | 9/1991 | Juds et al. ...................... 356/71 |
| 5,235,169 A | * | 8/1993 | Wakaumi et al. ........... 235/472 |
| 5,798,514 A | * | 8/1998 | Domanik .................... 235/464 |
| 5,861,613 A | * | 1/1999 | Apelberg et al. ........... 235/464 |
| 6,081,627 A | * | 6/2000 | Kannon et al. ............. 382/312 |

FOREIGN PATENT DOCUMENTS

| | | |
|---|---|---|
| EP | 0 706 146 | 4/1996 |
| GB | 2 154 775 | 9/1985 |
| WO | WO 83 00 243 | 1/1983 |
| WO | WO 93/19445 | 9/1993 |

OTHER PUBLICATIONS

"Videometrishe Barcode Erfassung" Stemmer Imaging GmbH D–82178 Puchheim / Germany.

* cited by examiner

Primary Examiner—Michael G. Lee
Assistant Examiner—Ahshik Kim
(74) Attorney, Agent, or Firm—Paul Vincent (57) ABSTRACT

A device and a method for characterizing and identifying an object, e.g. a container, with a surface visible from outside the object, onto which is disposed an optically readable one-dimensional bar code consisting of bars and spaces, are characterized in that the bar code is disposed in an annular range (2) of the surface, that the bars and spaces extend in a star-like manner from a center of the annular area (2) to the outside and that the bar code is read in the circumferential direction of the annular area (2). This device and method enable automatic detection, recognition and identification of objects, like e.g. sample bottles for spectroscopic analysis in a simple technically undemanding and cheap manner, wherein automatic identification of hollow, in particular hollow cylindrical objects can also be easily realized.

1 Claim, 1 Drawing Sheet

DEVICE AND METHOD FOR CHARACTERIZING AND IDENTIFYING AN OBJECT

This application claims Paris Convention priority of DE 199 10 226.0 filed Mar. 9, 1999, the complete disclosure of which is hereby incorporated by reference.

BACKGROUND OF THE INVENTION

The invention concerns a device and a method for characterizing and identifying an object, e.g. a container, with a surface visible from outside the object, onto which is disposed an optically readable one-dimensional bar code consisting of bars and spaces.

A device of this type and a corresponding method are known from the internet article "BARCODE" by the company Stemmer Imaging GmbH, D-82178 Puchheim, http://www.cvc-imaging.com, last update 9. July 1998.

Bar codes belong to the group of optical codes and are widely used today. The arrangement of bars and spaces of varying widths can be found mainly on packings of all kinds. Thereon, the disposed bar code contains information e.g. about the producer, the product, use-by date, price, etc. But also in the industrial field, the use of bar codes offers advantages since the marking of products with bar codes can automate and/or accelerate production processes.

A patent application for the principle of bar code technology and the first bar code was filed in the U.S.A. in 1949. Due to the small number of electronic components available and corresponding high prices, application thereof was almost exclusively limited to the military. Only the introduction of microprocessors in 1970 allowed production of low-cost reading and processing devices which permitted longer operational times as compared with vacuum tube computers used up to then. The development of bar code technology experienced a real boost in 1982 when all objects used in connection with the army in the U.S.A. had to be provided with a bar code label for identification.

Due to the increasing variety of models, car manufacturers have also started to mark the different components for assembly and coordinated material supply.

A new advantage, in addition to fast and faultless data acquisition irrespective of the "weak point human labor", is more and more the reduced price of corresponding bar code printing programs and also bar code reading devices.

Some terms are frequently used in connection with bar codes which will be briefly explained in the following. This list was taken roughly from the book "Barcode—Einführung und Anwendungen" (Bar code—introduction and use) by Mathias Potter and Ralf Jesse, Verlag Heinz Heise GmbH & Co. KG, Hannover, 1st edition 1993 and contains only the terminology required for understanding the present work.

A line or bar is the dark element of a bar code. Its binary value is one.

A space is a bright element of a code. Its value is zero.

The bars and spaces are arranged in parallel according to a defined pattern which, in total, contains machine-readable information.

Element
This term describes a bar as well as a space.
A module is the narrowest element of a code. Wide bars and spaces are calculated as a multiple of a module.
Module Width X
This value states the width of the narrowest element of a bar code, of the module, in millimeters.

Quiet Zone
The area between two bar codes has to be bright to indicate the start or end of the code to the reading device. This area is called the quiet zone.
Start and Stop Characters
Start and stop characters define a bar code. At the same time they ensure that bar codes can be read forwards and backwards. The start and stop characters of the bar codes are usually designed such that when they are read from the left to the right their sequence differs from that read from the right to the left. Some bar codes use so-called marginal characters instead of the usual start and stop characters.
Check-sum Digit
Bar codes may be provided with one or more check-sum digits for improving detection of decoding errors. Some codes demand the use of check-sum digits.
Tolerance
To permit correct reading of bar codes, only small tolerances from the nominal width or height are allowed. The tolerances are selected such that the bar code elements of differing widths can always be clearly delimited from one another. With many bar codes, sufficient distinction is achieved when wide bar code elements are two to three times as wide as narrow elements.
Ratio
This term is met only in connection with codes having two widths. The Ratio V states the relationship of the width of a broad element to the width of a narrow element (module).

In the course of time, many different bar code types were generated which were adapted to special applications.
One-dimensional Bar Codes
This type of bar code is the most widely used at the moment. Its design consists of a sequence of vertical, wider or narrower lines. One-dimensional bar codes are classified again into codes of two widths and multiple widths.
Codes of Two Widths
Two-widths code means that the elements of the bar code can assume only two different widths. This includes the code 2/5—family, the code Codabar and the code 39. Multiple-widths codes are e.g. code 93, code 128 and code EAN.

Bar codes are also widely used in science. A concrete new field of application can be found in the current production of the preparation robot NMRAutoPrep by the company Bruker Analytik GmbH which prepares samples for NMR spectroscopy and supplies same to an NMR spectrometer via a transport system.

The sample preparation is carried out automatically by the preparation robot by means of input analysis instructions. Correlation between the request and the sample is currently effected via a commercial bar code label disposed on the bottle.

The preparation robot NMRAutoPrep also offers the possibility of preparing samples for a BEST-NMR analysis (BEST-NMR=Bruker Efficiency Sample Transfer NMR). Thereby, the prepared sample is intermittently stored in 2 ml bottles of which up to 96 are located in a container, the so-called rack. This rack is then transmitted manually to a robot of the company Gilson which suctions the samples out of the bottles and supplies same to the probe head of the NMR magnet via a thin hose.

Up to now, the NMR analysis bottle could not be uniquely identified since mounting of a bar code label on the bottle is not possible due to the construction of the rack. The bar code label would be partly covered and for this reason the bottle would have to be lifted out of the rack and possibly turned. A one-dimensional bar code on the bottle lid would be larger than the diameter of the bottle (11 mm) and a twodimensional bar code is also not possible due to the injection point (septum of rubber) in the center of the lid.

For this reason, the position of the bottle within the rack is stored and thereby provides correlation to the sample. It is, however, possible that bottles are mixed up during transport from the preparation robot NMRAutoPrep to the Gilson robot. For this reason, the current solution is not satisfactory.

In contrast thereto, it is the purpose of the present invention to present a device and a method for automatic detection, recognition and identification of objects, e.g. the above-mentioned bottles, which provide automatic identification of hollow, in particular hollow-cylindrical objects in as simple, technically undemanding and cheap manner as possible.

SUMMARY OF THE INVENTION

This object is achieved in accordance with the invention in that the bar code is disposed in an annular area of the bottle, that the bars and spaces extend in the shape of a star from a center of the annular area towards the outside and that the bar code is readable in the circumferential direction of the annular area.

A recess or a hole may thereby be provided inside of the annular area, e.g. the inlet opening of a bottle, and the structure outside of the annular area is unimportant for the inventive characterization. Since the bars and spaces of the bar code extend in a star-like manner radially outwardly, the bar code structured according to the invention can be read by optical scanning in the circumferential direction of the annular area, wherein the annular area does not have to be circular, but merely has to be a continuous annular surface. A continuous line extending in the circumferential direction of the annular area, to which the bars and spaces of the bar code according to the invention are essentially perpendicular, would be considerably longer, for identical surface of the annular area, compared to e.g. a line extending radially outwardly, with a bar code arranged annularly about the center in the annular area, such that the arrangement of the bar code according to the invention enables considerably higher information density.

In a preferred manner, the area containing the annular area is disposed on the upper side of a lid with which the container can be closed. Therefore, the inventive bar code can be easily read from the top without having to lift or possibly turn the container.

In a particularly preferred embodiment, the container is a bottle which is particularly suitable for demonstration of the advantages of the invention.

In a further development of this embodiment, the bottle is a sample bottle for spectroscopic analysis, in particular for nuclear magnetic resonance (=NMR) spectroscopy in an automated NMR analysis device using the above-described sample bottles as standard. The device according to the invention was particularly optimized especially for this purpose of use.

To improve characterization and identification of objects like e.g. hollow-cylindrical plastic sleeves, an advantageous embodiment of the device in accordance with the invention provides that the surface in the section enclosed by the annular area comprises a hole.

A further development is particularly preferred wherein the lid comprises a septum for injecting substances, the septum being enclosed by the annular area.

In this manner it is possible to store a large amount of information about the substance filled into the sample bottle, on the lid, wherein the annular surface for the bar code does not impair filling in the substance.

Advantageously, the automated NMR analysis device is comprised of a retaining device, in particular a retaining metal sheet, wherein the retaining device comprises a preferably circular window through which the bar code can be read. By means of the retaining device, the sample bottle can be held in a predetermined position through pressure on the lid.

In a particularly preferred embodiment, the annular area is an annulus as predetermined by the common geometrical shape of a bottle. An oval shape e.g. would not fit onto a conventional bottle opening or only incompletely utilize the space provided for characterization.

In a further advantageous embodiment the annular area is provided with a sector-shaped section as quiet zone of the bar code without any bars. This ensures reliable recognition of the beginning and end of the bar code.

One embodiment of the inventive device is of particular importance, wherein the bar code is disposed on a preferably self-adhesive label, in particular printed thereon. This enables easy and cheap printing e.g. by means of a standard printer connected to a PC.

In an alternative embodiment, the bar code may also be disposed directly onto the object to be characterized, in particular printed thereon, injection molded thereon, engraved or thermally disposed thereon. This increases the service life of the bar code and can usually not be removed afterwards which enables permanent reliable identification of the characterized object.

A further particularly preferred form of the inventive device is characterized by a reading means which can be moved, in particular rotated, relative to the bar code in the circumferential direction of the annular area for detecting the bar code. Thus, standard bar code reading means for reading out the inventive bar code can be used and complicated evaluation methods can be omitted.

A particularly cheap reading possibility is achieved by providing the reading means with a scanner including a reading pen.

In a further development the reading pen is stationary and the object to be identified with the bar code is movable relative to the reading pen. This avoids "cable chaos" of the electric supply to the reading pen during reading.

As an alternative, the object bearing the bar code may be held stationary during identification and the reading pen may be movable relative to the object. This allows simple handling of the objects since these may be held stationary during reading of the bar code.

A further alternative embodiment of the device according to the invention provides an image detection system with pattern recognition which can read the bar code in the annular area. Thereby, it is possible to hold the object to be identified bearing the inventive bar code and also the reading means in a stationary manner since reading does not require relative movement with respect to one another. Moreover, individual programming of the reading parameters may be carried out.

In a further preferred embodiment, the image acquisition system may acquire image data within a window and pass them on in digitized form to a computer with pattern-recognition software.

The image acquisition system preferably comprises a commercial "CCD (charge coupled device) camera" which can currently be obtained at relatively low cost.

With respect to the method, the above-defined object of the invention is achieved in that for characterizing the object, the bar code is disposed in an annular area of the surface in such a manner that the bars and spaces extend in the shape of a star from a center of the annular range towards the outside and that the bar code for identifying the object is read out in the circumferential direction of the annular range.

One variant of the method in accordance with the invention is particularly preferred in which the bar code is disposed on the surface in a circular area between a predetermined minimum radius $r_1$ and a predetermined maximum radius $r_2$. This defines an inner minimum reading radius for maintaining tolerances.

Preferably, the bars and spaces of the bar code on a circle of a radius $r_x$, wherein $r_1 \leq r_x \leq r_2$, correspond to the tolerances of a bar code specific standard, in particular the German industrial standard DIN EN 798, 799, 800, 801.

When a reading means with scanner and reading pen is used, it is advantageous to read the bar code with the reading pen of the scanner in the circumferential direction of the annular area on a radius $r_L$, wherein $r_x \leq r_L \leq r_2$.

With the use of an image acquisition system with pattern recognition within a window, the following embodiment of the method in accordance with the invention is particularly preferred:

(a) Recording of an image, comprising at least the annular area, by means of the image acquisition system;

(b) Storing the recorded image in a digitized manner;

(c) Segmentation of the digitized image in the computer into associated bar code rings and allocation to individual object-related classes (=classification).

(d) Finding of the radially inner bar code limit on the radius $r_1$ and of the radially outer bar code limit on the radius $r_2$ for each object-related class;

(e) Reading of the bar code of each object-related class on a radius $r_L$ wherein $r_x \leq r_L \leq r_2$;

(f) Decoding of the read bar code for each object-related class.

For elimination of interferences, a further development of this method variant is advantageous, in which a digital noise filter is applied to the image recorded in step (a), preferably after step (b).

One variant of the method is also preferred wherein the gray scale range of the image recorded in step (a) is spread and binarized which is also carried out preferably according to step (b). This makes the method less sensitive to possible changes in ambient light conditions.

To save time, the above-described method variants can be improved in that several annular areas of differing objects are recorded simultaneously in one single image in step (a).

A further improved method variant provides detection of all straight lines forming the respective image segment by means of Hough transformation in step (d) and that from the points of intersection of all detected straight lines, the center of gravity is calculated and identified as center of the bar code on the respective annular area. This enables reliable detection of the (virtual) center of the bar code in accordance with the invention.

A further improved method variant takes into consideration only the points of intersection in a predetermined window within the image segment. This allows suppression of disturbing straight lines at the edge of the annular section.

For ensuring reliable identification of the corresponding object, the following method steps are advantageous:

($e_1$) Reading of the bar code on a radius $r_L$ wherein $r_x \leq r_L \leq r_2$;

($e_2$) Extraction of the quiet zone ($e_3$) Combination of pixels of the same color black or white;

($e_4$) Determination of the respective relative element width of the signals for bars or spaces of the bar code as a multiple of the thinnest bar or the thinnest space (=module);

($e_5$) Interpretation of the recognized pattern of bars and spaces as bar code and assignment to a corresponding known bar code type.

Safety can be further increased by reading the bar code on several differing radii $r_L'$, $r_{L41}$ ... wherein $rx \leq r_L'$, $r_L''$, ... $\leq r_2$.

Further advantages of the invention can be derived from the description and the drawing. The features mentioned above and below may be used in accordance with the invention either individually or collectively in arbitrary combination. The embodiments shown and described are not to be understood as exhaustive enumeration, rather have exemplary character for describing the invention.

The invention is shown in the drawing and is explained in more detail by means of the embodiments.

DESCRIPTION OF THE PREFERRED EMBODIMENT

Figure 1:
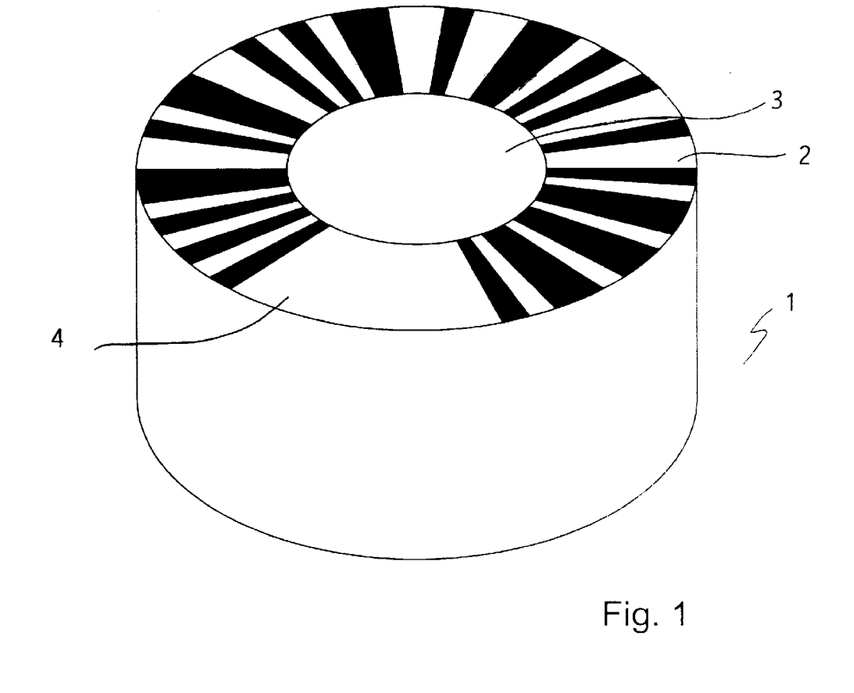
FIG. 1 shows a schematic top view of the upper side of a lid with an annular bar code in accordance with the invention.

FIG. 1 schematically shows a lid 1 by means of which a container, e.g. a bottle, in particular a sample bottle for spectroscopic analyses can be closed. On the upper side of the lid 1, an annular area 2 in the embodiment shown of circular shape, surrounds, in the present case, a circular hole 3 in the lid 1. For liquid samples, the hole 3 may comprise a septum for injecting substances.

The annular area 2 contains bars and spaces of a one-dimensional bar code which extend in a star-shaped manner from a (not visible, imaginary) center of the annular area 2, which is in the center of the circular hole 3, and extend radially outwardly. The bar code can be read in the circumferential direction of the annular area 2.

The beginning and end of the code are marked by a sector-shaped section 4 provided as quiet zone of the bar code which does not contain any bars.

The present invention presents a device and a method for automatically recognizing and identifying circular bar codes. These bar codes were developed especially for 2 ml bottles for NMR analysis, wherein standard bar code types are printed in the form of a circle onto the bottle lid, whose center is provided with a septum for the injection of substances. The bar codes are read via a camera, coupled to an image processing system, and thus allow reliable identification of the analysis sample. In this connection, the bar code on the lid may be read without moving the bottle and furthermore allows access to the septum by means of a preparation robot.

The following illustrates how the system components were selected from the given specifications to allow cooperation of the entire system. A suitable system would initially be a camera system since conventional bar code scanners cannot read "in circles".

The basis for selection of the components is the used bar code and its information density. 12 alphanumerical characters on one bar code label would be desirable to guarantee sufficient information also in the future.

It is possible to screw onto the analysis bottles lids of two different sizes:

| Lid variants | outer diameter | inner diameter |
|---|---|---|
| lid 1 | 11.0 mm | 5.5 mm |
| lid 2 | 12.5 mm | 7.0 mm |

For mounting the bar code on the lid, adhesive labels having an outer diameter of 11 mm and an inner diameter of 7 mm seem to be suitable which may be glued onto both lids.

The possible information density of the bar code label primarily depends on the printing quality. For each bar code, tolerances with respect to the module width have to be kept, which requires a certain number of printed dots per module. This size, the geometrical dimensions and the required number of modules per character determine the maximum number of characters which can be represented.

Theoretical considerations have shown that the codes 2/5 interleaved (numerical) and code 39 (alphanumerical) offer high information densities. For this reason, the system is to be designed such that these codes can be printed and read. In principle, also other one-dimensional codes like code 128 are feasible.

The bar codes are to be printed onto labels and then glued to bottles. Various label materials (adhesive paper, aluminum-coated foil, polyester) were selected considering their printability, with a standard laser printer, price and resistance to the solvents used in NMR analysis (DMSO= dimethyl sulfoxide, isopropanol, chloroform, acetone). The print and label have proven resistant to all solvents. Merely acetone may blur the printed image. For the prototype series, adhesive paper labels of the company Hi-Etiketten Hort Ingelmann, Laatzen, are used. Special software is used for this purpose which can be operated on PCs under Windows NT 4.0.

Within the scope of the present invention, the bar code reading software and also the bar code printing software was programmed entirely in the development environment Delphi 3.0 of the company Borland Inc. It is classified roughly into four processing steps represented in diagram 1 in the appendix. Each of these four processing steps contains a sequence of processing steps further explained in the following:

Recording of a camera image requires the processing steps shown in flow chart diagram 2.

Each of these processing steps contains a corresponding function in a function library of the Frame-Grabber software included in the reading software.

After reading the image, the pure video data is available for further processing. Extraction of the bar code label is carried out using the image processing sequence in diagram 3.

Some functions in diagram 3 comprise parameters which have to be adjusted to the given camera image.

At first, the read camera image is spread, i.e. the gray scales of the image are extended to the range of 0 to 255.

Subsequently, the image is binarized, i.e. the gray scale image with the gray scale range between 0 and 255 is converted into a black and white image with gray scales between 0 and 255. The parameter "threshold" is set such that the bar codes remain unchanged, i.e. the elements of the bar code should not become wider nor smaller by this operation. This can only be achieved by illuminating the objects within the camera image in such a manner that the lines of the bar code are the darkest points in the image.

After binarization, so-called closing is carried out, i.e. binary dilatation followed by binary erosion. This operation removes dot-shaped black interferences from the image. The parameter "size of the structure element" gives the side length of the square structured element in pixels and has to be set such that the subsequent closing image does not contain interferences but merely the bar code labels which are of course also changed by the closing operation.

This effect is non-critical, since the closing image is used merely for finding the edges of the circle and is not used for evaluating the bar codes.

Moreover, one has to ensure already here that the area between the bar code labels is white: There should be no black connection, e.g. due to shadows, between the labels which could disturb later classification.

The obtained closing image is scanned for data reduction. The parameter "grid size" gives the side length of a square in pixels. The arithmetic average value is calculated from the gray scales of all pixels within the square and inserted into the scanned image as gray scale. The "scan size" has to be set such that the subsequent image still shows the outlines of the bar code labels. The code itself should be represented by gray scales.

The following threshold operation further binarizes the image and thus serves as basis for classification. The parameter "threshold" has to be set such that the bar code label remains visible as a black ring. Small interruptions and the white zone between start and end of the bar code (=quiet zone) do not present a problem.

This image forms the basis for classification and is searched for black areas. All black dots having a distance of at the most "min_dist" from another black dot are combined to a group of dots, a so-called class. Dots having a distance larger than "min_dist" from the other black dots are assumed not to belong to an existing class and a new class is started. The parameter "min_dist" is set such that only one single bar code label is completely classified in one class.

At the end of this sequence, the rough, binned coordinates of each object within the image are fixed. Each of these classes is examined individually to see whether it contains a valid bar code label.

At first, the outer edges of the circle are searched. For this purpose, the edges of a square enclosing the object are shortened until at least 1 black pixel was found in the closing image at all four edges. This square represents the outer limit of the object.

Figure 2A:
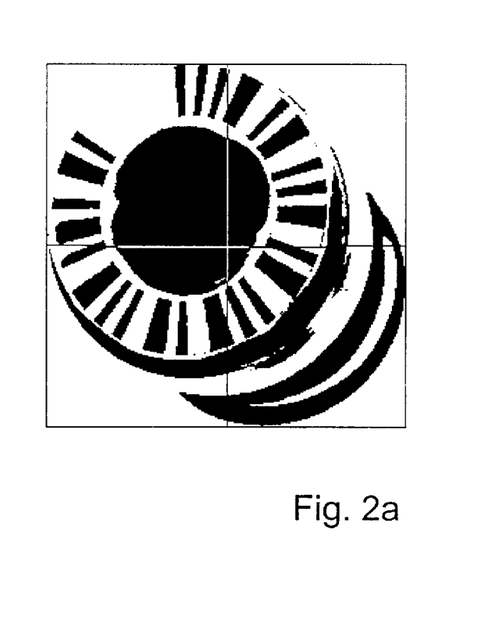
FIG. 2a shows a slanted top view of a square image of a bottle with a lid according to FIG. 1, wherein the center of the image does not coincide with the center of the annular area.

In the ideal case one obtains at this location a square exactly enclosing the bar code label. This is, however, not always the case since the view of the camera onto a bottle located at the edge of the image may be slanted, and it is therefore possible that one obtains a rectangle or a square which is too large or displaced, as shown in FIG. 2a.

To calculate the bar code center in this case, one cannot simply use the center of the rectangle since this is not the center of the bar code label. The correct finding of the center is however an important function since only in this case it is possible to correctly read the printed bar code. FIG. 2a clearly shows that it is not possible to draw a circle of an arbitrary radius about the center such that the label is completely sampled by the circle. For this reason, the scheme shown in diagram 4 is used to find the circle center using the Hough transformation [see P. Haberäcker, "Digitale Bildverarbeitung", Carl Hauser Verlag, München Wien, 1989].

Figure 2B:
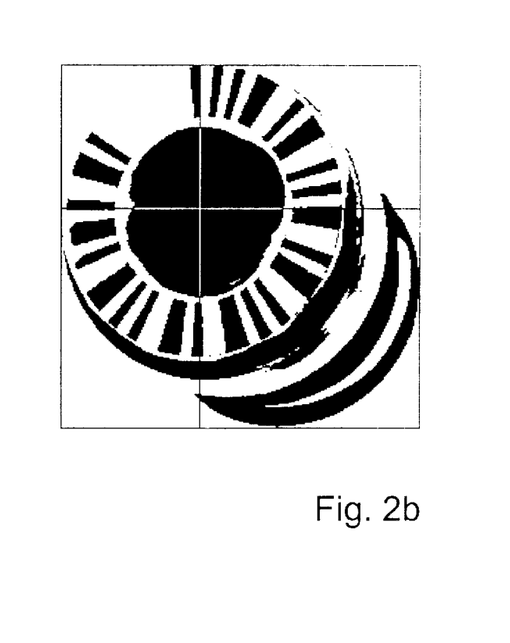
FIG. 2b shows the same as FIG. 2a, however, with a cross-hair in the center of the annular range.

The Hough transformation extracts points lying on a straight line. In the concrete case, it represents all edges of the individual elements of the bar code as straight lines. The points of intersection of various straight lines in this image meet in the center of the bar code label, as shown in FIG. 2b.

The inner edge of the circle is searched by means of the center found with the aid of the parameter "Threshold_Pixels". This value is set such that the edge of the septum and thus the start of the bar code label can be found. The start of the bar code is characterized by an alternating black and white structure.

As a precaution, this parameter should be selected somewhat smaller, otherwise it could happen that the inner edge of the circle coincides with the outer edge and the bar code label cannot be read any more.

The center of the circle and the inner and outer edges of the detected circle fix the exact position of a bar code label within this image. Incrementation between the inner and outer edge of the radius r takes place and reading of the circular bar code is tried in each case. For reading the bar code, the flow diagram 5 is used. This sequence again represents a series of individual processing sequences:

For determination of the element widths, the color values (black=0, white=1) of the binarized image are read out pixel by pixel along a circle, having a radius r, in the clockwise direction and stored in a character sequence, the so-called "color string". This character sequence is at first searched for the quiet zone, i.e. the longest connected sequence of ones (=white surface). Subsequently, the quiet zone is separated from the character sequence "color string". "Color string" now contains only the actual bar code information which has to start with a start character and end with a stop character.

In this character sequence, the number of sequential identical color values are counted and stored as element width in another character sequence, the so-called element width string.

The element width string determined in this manner cannot yet be used to read the information stored in the code, since the size of the numbers in the element width string depends, of course, on the size of the bar code label and on the reading radius r at which the code is being read.

For this reason, a normalization is initially carried out to determine the module width and calculate therefrom the width of the individual elements in units of the module width. This effects independence on the size of the bar code labels and also on the reading radius. For standardization, the algorithm described in diagram 6 is used.

Starting point: Element width string: 3 4 2 4 6 4 3 3 4 3 4 7 6 7 7 3 2

At first, the histogram of the element width string is set up (step 1). This kind of representation enables to draw a limit between the thick and thin elements of the bar code. A preliminary limit is determined via the center of gravity of the histogram (step 2). The next step (step 3) determines the module width. Towards this end, only the lower part of the histogram is regarded in front of its center of gravity and the center of gravity of this part is again determined. It is possible to calculate the actual separating line G1 between thick and thin elements (step 4) from the calculated module width (in pixels). Since with two width codes, only 2 element widths (single and double module width) can occur, the limit is set exactly in the middle, i.e. at 1.5 times the module width. For multiple width codes which may assume 1 to 4 times the module width as element width, the limits G2 and G3 are calculated to again lie exactly between the possible element widths. The last step (step 5) includes assignment of the numbers from the element width string into an element string containing the element widths relative to the module width found.

The following is an interpretation of this element string as bar code. For this purpose it is passed on to routines which decompose it according to the construction rules corresponding to the various codes, and check it for validity. As soon as a routine has recognized the element string as a "valid" code, the subsequent efforts with other codes are omitted.

The principal sequence of interpretation of the element string as bar code is shown in the following diagram by means of an example for the code 2/5 in diagram 7 in an interleaved manner. Although this sequence is specifically valid for the code 2/5 interleaved, the sequence is approximately the same for all search routines.

If an error occurs at any of these 8 points, e.g. no start or stop character can be found, the sequence of numbers does not represent a valid combination etc., the sequence is stopped and the information is labeled as "not readable".

In such a case, the attempt is initially repeated using the reflected string, since the bar code label could contain the information in the counter clock-wise direction and not in the clock-wise direction, as previously assumed.

Only if this attempt also fails, is the element string passed on to the next routine to search for another bar code type, e.g. code 39.

If the bar code label contains check-sum digits one can prescribe that these be examined for correctness. Only if the check-sum digits have been recognized as correct, is the bar code regarded as "being read validly and faultlessly".

Information which has been recognized as valid is stored in a table which, after passage of all radii between the inner and outer edge of the circle, is examined for that information having the most entries. This information is then output as the information present in the bar code if it has been correctly read more often than specified in the parameter "safety".

Diagram 1
Operational steps of the barcode-reading software

Diagram 2
Flowchart for taking a picture with a Frame-Grabber

Diagram 4
Search barcode-center using „Hough-Transformation"

| Copy the square found from camera picture to temporary buffer | → | Determine X- and Y-gradient image using Sobel-Operator | → | Calculate amount- and direction-image of X- and Y-gradient. Thin gradient's amount image | → | Register the points in the „Hough" coordination system. Search dominant points (equal to long straight lines) | → | Calculate the points of intersection for all lines → Centre of barcode-label |

Diagram 5
Flowchart for reading the extracted Barcode-Label

Establish width (in pixels) of the barcode elements on a circle's circumference having the radius r

↓

Calculate the relative element width as multiples of smallest width (=module width)

↓

Check all known barcode-schemes, if the series of element widths found is equal to known barcode-scheme including start-, stop- and character (or number) signs. In this case, save the recognized information to a table in computers memory.

Diagram 6: Flowchart for calculation of relative element widths

| Algorithm | Example |
|---|---|
| 1. Establish histogram of element widths<br><br>pixels | (histogram of X marks at positions 1-8) |
| 2. Calculate point of gravity = preliminary threshold between thick/thin elements | $$\text{P. of Gravity} = \frac{\sum_{i=1}^{8} i \cdot n_i}{\sum_{i=1}^{8} n_i} = \frac{4 + 15 + 20 + 12 + 21}{2 + 5 + 5 + 2 + 3} = 4{,}25$$<br>$n_i$ = Number of entries at element width i (pixels)<br>Calculation of the Point of Gravity<br>rounded down: Point of Gravity = 4 |
| 3. Calculate point of gravity of the lower range of the histogram = module width | $$\text{Modulewidth} = \frac{\sum_{i=1}^{4} i \cdot n_i}{\sum_{i=1}^{4} n_i} = \frac{4 + 15 + 20}{2 + 5 + 5} = 3{,}25$$<br>Calculation of module width |

We claim:

1. A method for characterizing and identifying an object, the method comprising the steps of:

a) disposing a one-dimensional bar code on an upper surface of a lid, said lid closing a sample bottle, said bar code occupying an annular portion on said upper surface of said lid, said bar code having bars and spaces extending from a center of said annular area, in a star-shaped manner, towards an outside thereof, wherein said bar code is disposed on said upper surface in an annular area between a predetermined minimum radius $r_1$ and a predetermined maximum radius $r_2$;

b) reading said bar code along a circumferential direction of said annular area;

c) recording an image, comprising said annular area, using an image detecting system;

d) storing said recorded image in digitized form;

e) segmenting said digitized image into associated bar code rings and allocation thereof to individual object-related classes;

f) determining a radially inner bar code limit at a radius $r_1$ and a radially outer bar code limit at a radius $r_2$ for each object-related class;

g) reading said bar code of each object-related class at a radius $r_L$, wherein $r_1 \leq r_L \leq r_2$;

h) extracting a quiet zone;

i) combining pixels of a same color black and a same color white;

j) determining a respective relative element width of signals for said bars and said spaces of said bar code as a multiple of one of a thinnest bar and a thinnest space;

k) interpreting a recognized pattern of said bars and said spaces as said bar code and associating said bar code with a corresponding known bar code type, to decode said read bar code for each object-related class; and l) placing said sample bottle unit into one of a spectroscopic analysis device and an automated nuclear magnetic resonance (NMR) spectroscopic device.

\* \* \* \* \*